US012552008B1

(12) United States Patent
Coleman et al.

(10) Patent No.: US 12,552,008 B1
(45) Date of Patent: Feb. 17, 2026

(54) HAND TOOL WITH INTERCHANGEABLE HEADS

(71) Applicants: Ronald Ray Coleman, Snohomish, WA (US); Blake Robert Coleman, Snohomish, WA (US); Bryce Patrick James Coleman, Snohomish, WA (US)

(72) Inventors: Ronald Ray Coleman, Snohomish, WA (US); Blake Robert Coleman, Snohomish, WA (US); Bryce Patrick James Coleman, Snohomish, WA (US)

( * ) Notice: Subject to any disclaimer, the term of this patent is extended or adjusted under 35 U.S.C. 154(b) by 352 days.

(21) Appl. No.: 18/233,516

(22) Filed: Aug. 14, 2023

(51) Int. Cl.
*B25G 3/26* (2006.01)
*B25H 3/00* (2006.01)

(52) U.S. Cl.
CPC ................ *B25G 3/26* (2013.01); *B25H 3/006* (2013.01)

(58) Field of Classification Search
CPC ............. B25G 3/26; B25G 1/06; B25H 3/006
USPC .............................................................. 81/25
See application file for complete search history.

(56) References Cited

U.S. PATENT DOCUMENTS

| | | | | | |
|---|---|---|---|---|---|
| 5,301,573 | A * | 4/1994 | Weber | B25B 23/103 | 81/53.2 |
| 5,337,836 | A * | 8/1994 | Williams | E02D 7/04 | 173/90 |
| 6,732,617 | B2 * | 5/2004 | Steinweg | B25B 7/04 | 403/324 |
| 6,862,765 | B2 * | 3/2005 | Liou | B25D 1/02 | 7/143 |
| 7,089,829 | B2 * | 8/2006 | Chen | B25B 23/0035 | 81/62 |
| 2006/0144195 | A1 * | 7/2006 | Tanga | B25G 3/06 | 81/20 |
| 2008/0016636 | A1 * | 1/2008 | Morris | B25G 3/28 | 15/145 |

* cited by examiner

*Primary Examiner* — Hadi Shakeri
(74) *Attorney, Agent, or Firm* — Plager Schack LLP; Mark H. Plager; Kara K. Verryt

(57) ABSTRACT

A hand tool with multiple interchangeable heads may include a handle with a first end and a second end; a spring loaded connector head extending from the first end of the handle; a tool head configured to interchangeably attach to the handle, wherein the tool head includes a connection block therein; and the connection block is configured to removably engage with the spring loaded connector head.

3 Claims, 4 Drawing Sheets

HAND TOOL WITH INTERCHANGEABLE HEADS

BACKGROUND

The embodiments described herein relate generally to tools and, more particularly, to a hand tool with multiple interchangeable heads.

Conventional hand tools have redundant features and, specifically, duplicate handles, which wastes materials and increases the carbon footprint to manufacture. Moreover, having multiple handles increases cost and takes up unnecessary space when stored or transported. Thus, conventional tool kits are often bulky, heavy collections of hand tools, each of which individually include a common handle.

Therefore, what is needed is a hand tool that utilizes the interchangeability of multiple heads on a single handle, wherein the tool results in a more compact, lighter-weight tool kit that does not require the weight and bulk of a conventional toolbox.

SUMMARY

Some embodiments of the present disclosure include a hand tool with multiple interchangeable heads. The hand tool may include a handle with a first end and a second end; a spring loaded connector head extending from the first end of the handle; a tool head configured to interchangeably attach to the handle, wherein the tool head includes a connection block therein; and the connection block is configured to removably engage with the spring loaded connector head.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

Figure 1:
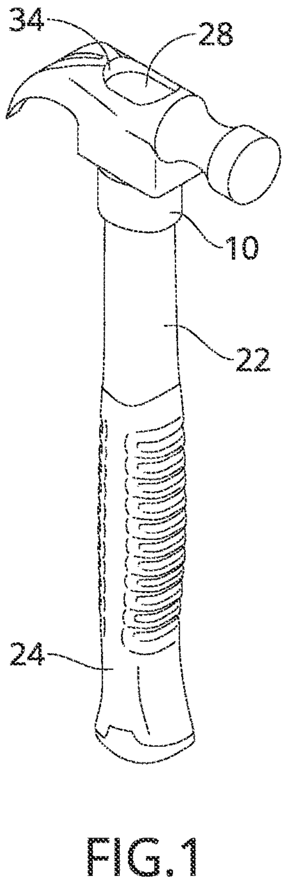
FIG. 1 is a perspective view of one embodiment of the present disclosure.
Figure 2:
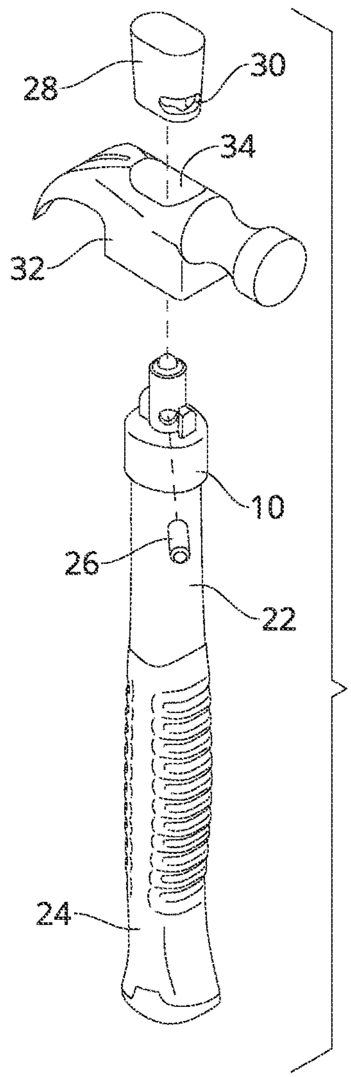
FIG. 2 is a partial exploded view of one embodiment of the present disclosure.
Figure 3:
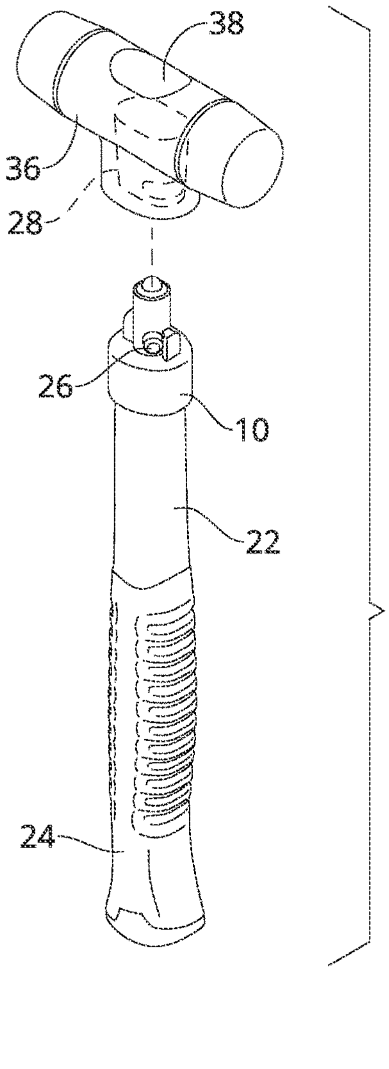
FIG. 3 is a perspective view of one embodiment of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a hand tool with multiple interchangeable heads and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

By way of example, and referring to FIGS. 1-8, some embodiments of the present disclosure include a hand tool with multiple interchangeable heads, the hand tool comprising a handle 22 with a first end and a second end; a connector head 10 extending from the first end of the handle 22; a tool head configured to interchangeably attach to the handle 22, wherein the tool head includes a connection block 28 attached or otherwise incorporated therein; and the connection block 28 is configured to removably engage with the connector head 10. In embodiments, the tool head may be a member selected from the group consisting of a claw head 32, a mallet head 36, a brush head 42, a ball peen head 44, a sledge head 48, a hatchet head 52, and the like.

Figure 4:
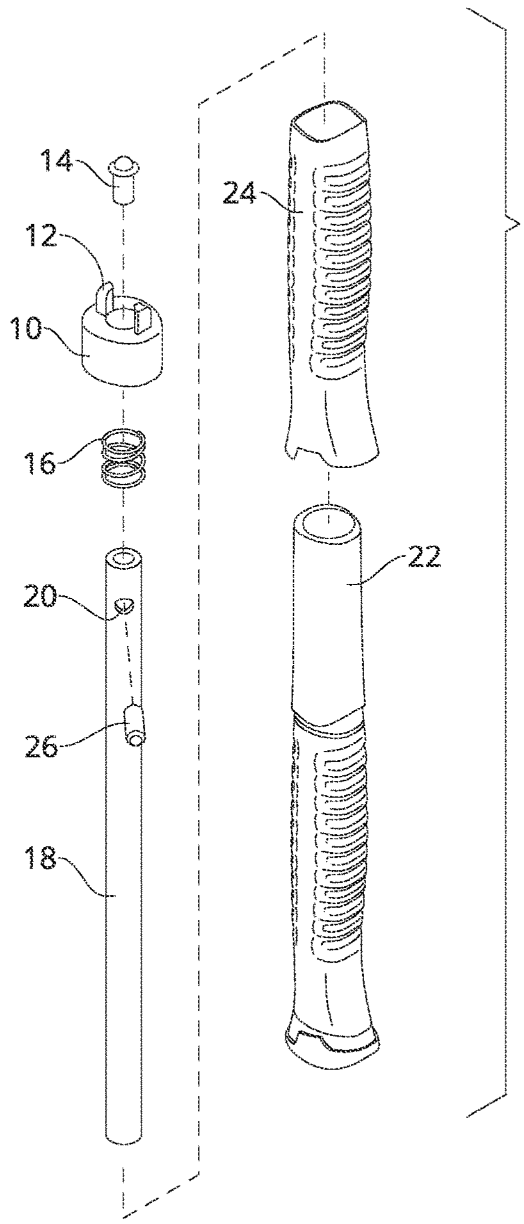
FIG. 4 is an exploded view of one embodiment of the present disclosure.
Figure 6:
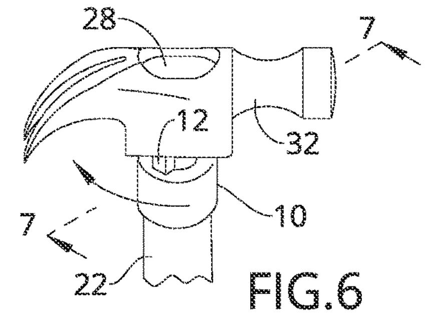
FIG. 6 is a detail perspective view of a first step of the installation of a tool head of the present disclosure.
Figure 7:
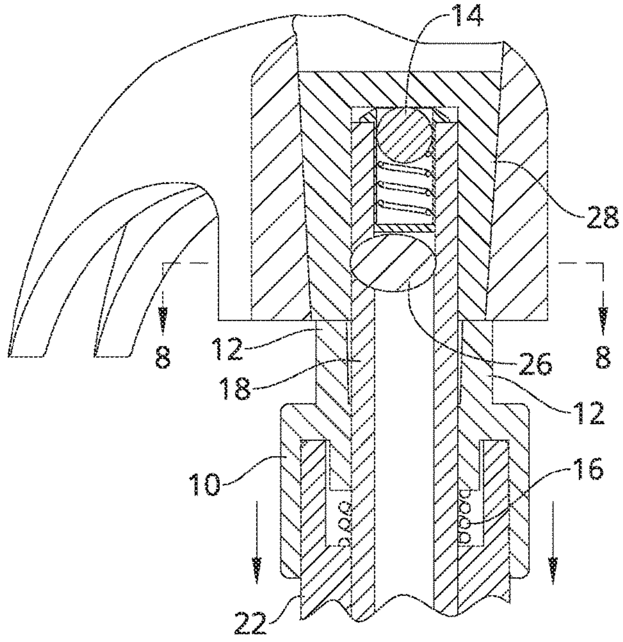
FIG. 7 is a section view of one embodiment of the present disclosure, taken along line 7-7 in FIG. 6.

In embodiments and as shown in the Figures, the handle 22 may be shaped like a conventional hammer handle. Moreover, the handle 22 may comprise an outer covering or sleeve 24 attached to or surrounding an outer surface thereof. The handle 22 may be made of a material such as wood, plastic, or metal, while the sleeve 24 may be made of a rubber material. As shown in the Figures, the first end of the handle 22 may be designed to removably engage with a tool head. More specifically, a connector head 10 may be attached to the first end of the handle 22. As shown in FIGS. 4 and 7, the connector head 10 may comprise a spring-loaded, collar-like body that is engaged with the first end of the handle 22. As shown in FIG. 4, the connector head 10 may have an open end configured to engage with the first end of the handle 22 and a closed upper surface, wherein the upper surface comprises a pair of connector head posts 12 extending outward therefrom and wherein a connector head channel extends through the connector head 10 from the closed end to the open end. The opening of the connector head channel at the closed end may be sized to accommodate insertion of a plunger, such as a ball nose spring plunger 14 therein, wherein the plunger is also inserted into the core shaft 18, capping the end of it. In other embodiments, the core shaft 18 may simply be capped permanently. As shown in FIGS. 4 and 7, a core shaft 18 is configured to be positioned within the handle 22, wherein a top end of the core shaft 18 is configured to be accommodated within the connector head channel. The core shaft 18 may be substantially hollow, wherein the top end is open and sized to accommodate insertion of the plunger therein. As shown in FIG. 7, the connector head channel may widen toward a second end thereof, wherein the second end of the connector head is configured to engage with the top end of the handle 22. A tab may extend within the channel wherein a spring 16 may be positioned between the tab and the top end of the handle 22. This spring 16, in its relaxed state, may push the connector head 10 upward along the core shaft 18.

As shown in FIG. 4, the core shaft 18 may be an elongate cylinder, wherein a pin orifice 20 may extend therethrough proximal to the top end thereof. The pin orifice 20 may be sized to accommodate insertion of a locking pin 26 therethrough. The core shaft 18 may be positioned and secured within the handle 22 and extend out from the first end thereof. In fact, as shown in the Figures, the core shaft 18 may extend out of the first end of the handle 22 and through the connector head 10 such that the connector head 10 is positioned on the core shaft 18, and the locking pin 26 is positioned between the connector head 10 and the first end of the handle 22, thus securing the connector head 10 on the core shaft 18.

As described above, the connector head 10 may be configured to removably engage with a connection block 28 either attached to or built into the desired tool head. In some embodiments, the tool head may comprise a connection block slot, wherein the connection block 28 is secured within the connection block slot using, for example, an adhesive or a weld, such as a liquid weld. For example, the claw head 32 may include a claw head connection block slot 34, the mallet head 36 may comprise the mallet head connection block slot 38, the ball peen head 44 may comprise a ball peen head connection head slot 46, the sledge head 48 may comprise a sledge head connection block slot 50, and the hatchet head 52 may comprise a hatchet head connection block slot 54. In other embodiments, a connection block may be built into the tool head and a locking slot 42. For example, the brush head 40 may comprise a locking slot 42.

Figure 5:
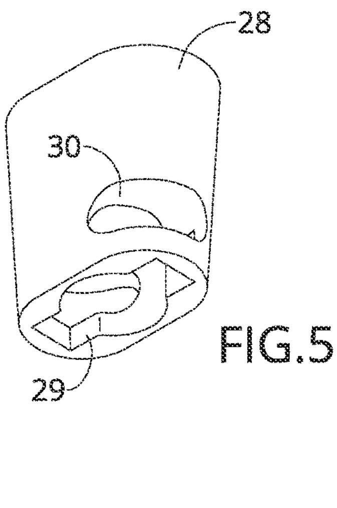
FIG. 5 is a bottom perspective view of a portion of one embodiment of the present disclosure.
Figure 8:
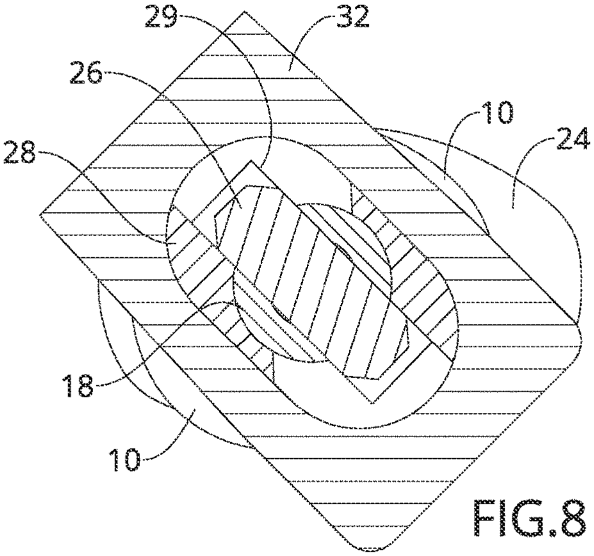
FIG. 8 is a section view of one embodiment of the present disclosure, taken along line 5-5 in FIG. 6.
Figure 9:
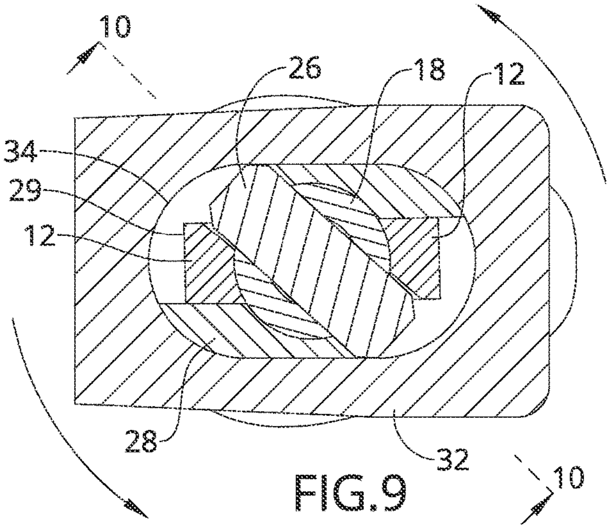
FIG. 9 is a section view of one embodiment of the present disclosure.
Figure 10:
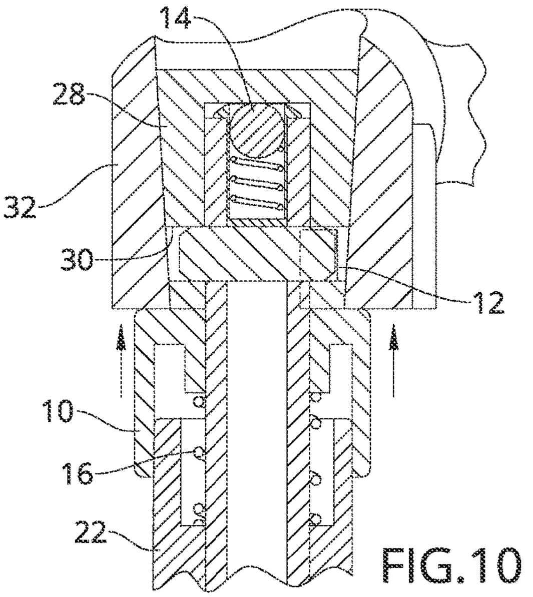
FIG. 10 is section view of one embodiment of the present disclosure, taken along line 6-6 in FIG. 5.
Figure 11:
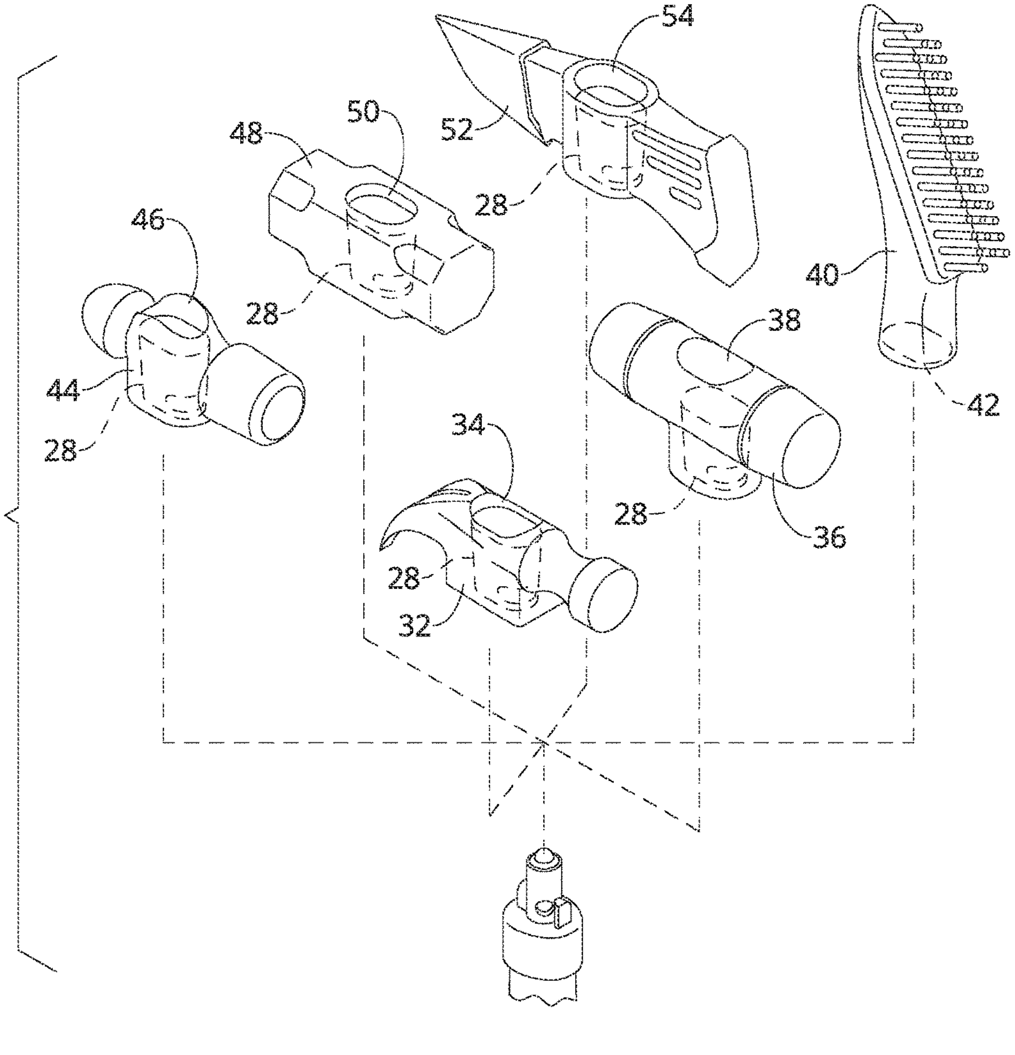
FIG. 11 is a perspective view of one embodiment of the present disclosure.

As shown in FIGS. 5, 8, and 9, the connection block 28 may comprise a block body with a bottom opening including a pin pass through slot 29. The connection block 28 may also comprise a block pin slot 30 extending through a side surface thereof. The pin pass through slot 29 may be sized to accommodate passage of the locking pin 26 therethrough and insertion of the connector head posts 12 therein. When a tool head is pressed downward onto the core shaft 18, the locking pin 26 on the core shaft 18 may pass through the pin pass through slot 29 and engage with the block pin slot 30, preventing the tool head from being unintentionally pulled off of the handle 22, and the connector head posts 12 may engage with the pin pass through slot 29, preventing the tool head from rotating with respect to the connector head 10 and handle 22. As such, the tool head may be secured to the handle 22 by simply pressing the tool head onto the core shaft 18 and connector head 10.

Figure 12:
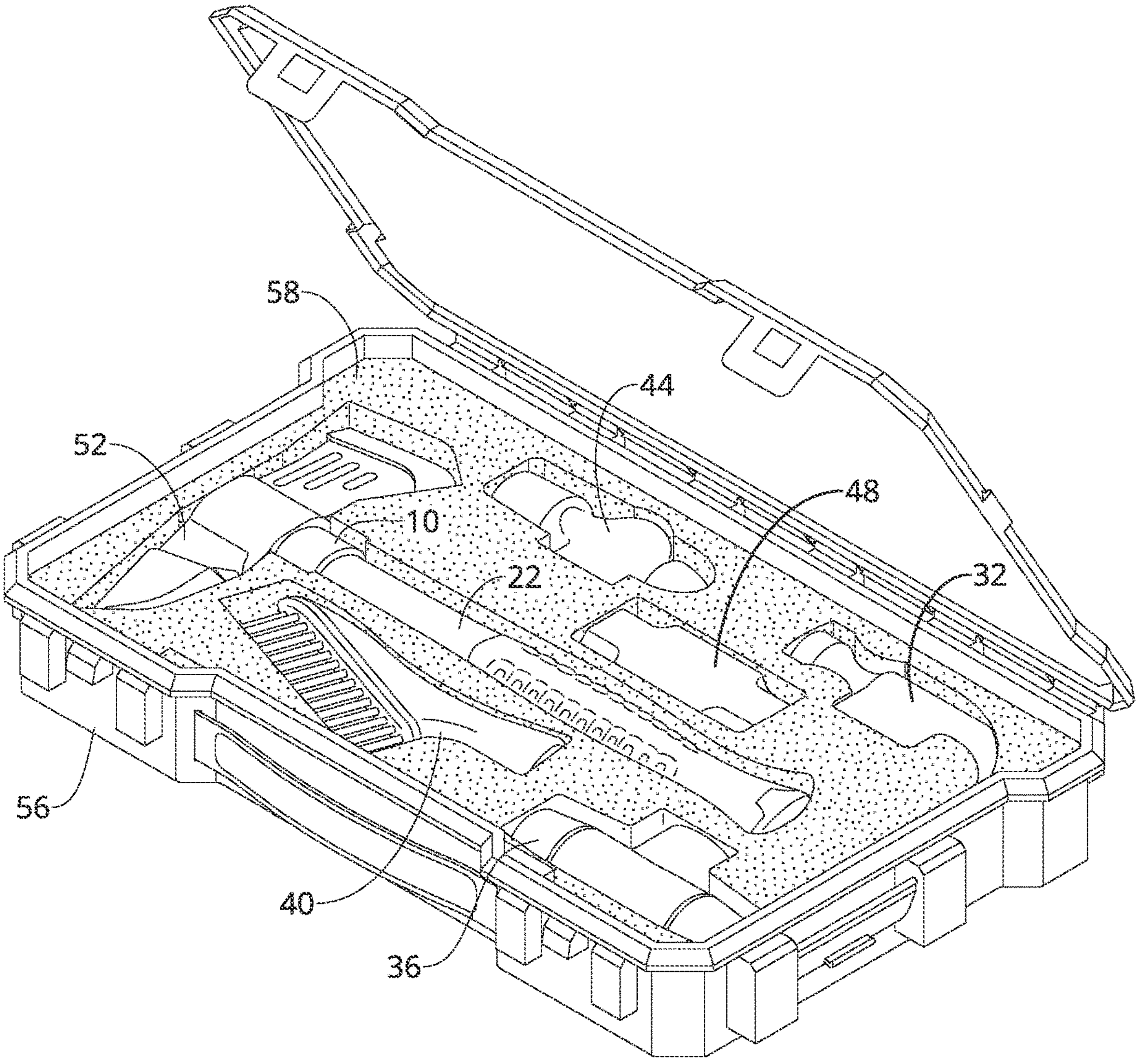
FIG. 12 is a perspective view of one embodiment of the present disclosure, shown stored in a case.

As shown in FIG. 12, some embodiments of the present disclosure may comprise a tool kit comprising a handle 22 with a plurality of interchangeable heads. The tool kit may further comprising a storage case 56 configured to securely and hold or store the components of the kit. In some embodiments, a case liner 58 with custom cutouts sized to accommodate each individual component of the kit may be positioned within the case 56.

The device of the present disclosure may be made of any suitable or desired materials and may have any desired dimensions. In a particular embodiment, the handle 22 may be made from fiberglass and steel, and the tool heads may be made from conventional materials used to make tool heads. While the above description and the Figures show exemplary tool heads, the device is not limited to such tool heads. In fact, it is envisioned that any desired tool head may be removably attached to the handle so long as the tool head has the corresponding connection block.

To use the device of the present disclosure, a user may grasp the handle and push the desired tool head downward thereon, inserting the shaft and locking pin into the connection block 28, providing for a secure attachment of the tool head to the handle. The tool may then be used as normal. To remove the tool head, the user may pull down on the connector head, causing the connector head posts 12 and locking pin 26 to disengage from the connection block 28.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A hand tool with multiple interchangeable heads, the hand tool comprising:
- a handle with a first end and a second end, the handle comprising:
  - a handle body; and
  - a core shaft positioned within the handle body;
- a spring loaded connector head extending from the first end of the handle, the connector head comprising a spring-loaded body with an open end that is engaged with a first end of the handle and an upper surface with a connector head channel extending therethrough, wherein:
  - the core shaft extends through the connector head channel;
  - the core shaft further comprises a locking pin extending therethrough, the locking pin positioned on the core shaft such that the connector head is positioned between the locking pin and the handle body;
  - the connector head further comprises a pair of connector head posts extending outward from the upper surface;
- a tool head configured to interchangeably attach to the handle; and
- a spring positioned within the connector head between an inner surface of the upper surface and a top edge of the handle, wherein:
- the tool head includes a connection block therein;
- the connection block is configured to removably engage with the spring loaded connector head;
- a top end of the core shaft extends outward from the handle body and is configured to be accommodated within the connector head when the tool head is engaged with the handle;
- the connection block comprises:
  - a block body with a bottom opening including a pin pass through slot; and
  - a lock pin slot extending through a side surface of the block body; and
- the pin pass through slot is sized to accommodate passage of the locking pin and insertion of the connector head posts therein.

2. The hand tool of claim 1, wherein the connection block is secured within a connection block slot in the tool head.

3. The hand tool of claim 1, wherein the tool head is a member selected from the group consisting of a claw head, a mallet head, a brush head, a ball peen head, a sledge head, and a hatchet head.

* * * * *